US011083041B2

(12) United States Patent
Batsakes et al.

(10) Patent No.: US 11,083,041 B2
(45) Date of Patent: *Aug. 3, 2021

(54) METHOD AND SYSTEM FOR INTEGRATION OF PORTABLE DEVICES WITH FLIGHT DECK DISPLAYS

(71) Applicant: The Boeing Company, Chicago, IL (US)

(72) Inventors: Peter James Batsakes, Seattle, WA (US); David E. Stulken, Cedar Rapids, IA (US); Paul Burkhead, Seattle, WA (US)

(73) Assignee: The Boeing Company, Chicago, IL (US)

(*) Notice: Subject to any disclaimer, the term of this patent is extended or adjusted under 35 U.S.C. 154(b) by 436 days.

This patent is subject to a terminal disclaimer.

(21) Appl. No.: 15/958,828

(22) Filed: Apr. 20, 2018

(65) Prior Publication Data

US 2018/0242390 A1    Aug. 23, 2018

Related U.S. Application Data

(63) Continuation of application No. 15/054,788, filed on Feb. 26, 2016, now Pat. No. 9,980,298.

(51) Int. Cl.
*H04W 76/40* (2018.01)
*B64D 45/00* (2006.01)
(Continued)

(52) U.S. Cl.
CPC ............ *H04W 76/40* (2018.02); *B64D 43/00* (2013.01); *B64D 45/00* (2013.01); *G01C 23/00* (2013.01);
(Continued)

(58) Field of Classification Search
CPC ....... H04W 76/40; H04W 4/90; H04W 76/50; G06F 3/147; G06F 3/01; G06F 3/1454;
(Continued)

(56) References Cited

U.S. PATENT DOCUMENTS 5,883,586 A * 3/1999 Tran ................. G01C 23/00
340/945
6,181,987 B1 * 1/2001 Deker ............... G01C 23/00
244/194

(Continued)

FOREIGN PATENT DOCUMENTS

CN          10322356 A      12/2008
CN         101652634 A       2/2010
(Continued)

OTHER PUBLICATIONS

European Office Action dated May 10, 2019, European Patent Application No. 16207326.6, 7 pages.
(Continued)

*Primary Examiner* — Rami Khatib
(74) *Attorney, Agent, or Firm* — Sage Patent Group

(57) ABSTRACT

A method for integration of a portable electronic device (PED) with a flight deck display in some embodiments includes providing an onboard network coupled to a flight-deck-installed, multi-function display and coupling the PED to the onboard network. The method may also include receiving information from a PED hosted application in the PED, routing information through a gateway and/or a plurality of firewalls, and displaying information on the flight-deck-installed, multi-function display. In some embodiments, a pilot control interface is coupled to the PED through the onboard network, and a plurality of functions on the PED is controlled via the pilot control interface. An airplane in some embodiments includes a fuselage portion, a wing portion, and a system that carries out the method, (Continued)

possibly through use of computer readable storage medium with stored instructions.

28 Claims, 6 Drawing Sheets

(51) Int. Cl.
| | |
|---|---|
| *H04W 4/90* | (2018.01) |
| *G06F 3/147* | (2006.01) |
| *G09G 5/00* | (2006.01) |
| *G01C 23/00* | (2006.01) |
| *B64D 43/00* | (2006.01) |
| *G06F 3/01* | (2006.01) |
| *G06F 3/14* | (2006.01) |
| *G06Q 50/30* | (2012.01) |
| *H04L 29/08* | (2006.01) |
| *H04W 76/50* | (2018.01) |
| *H04L 29/06* | (2006.01) |

(52) U.S. Cl.
CPC .............. *G06F 3/01* (2013.01); *G06F 3/147* (2013.01); *G06F 3/1454* (2013.01); *G06Q 50/30* (2013.01); *G09G 5/005* (2013.01); *H04L 67/12* (2013.01); *H04W 4/90* (2018.02); *H04W 76/50* (2018.02); *B64D 2045/0075* (2013.01); *G09G 2354/00* (2013.01); *G09G 2380/12* (2013.01); *H04L 63/20* (2013.01)

(58) Field of Classification Search
CPC ........ G01C 23/00; G06Q 50/30; B64D 45/00; B64D 2045/0075; B64D 43/00; G09G 2354/00; G09G 2380/12; G09G 5/005; H04L 63/20; H04L 67/12

See application file for complete search history.

(56) References Cited

U.S. PATENT DOCUMENTS

| | | | |
|---|---|---|---|
| 7,321,318 B2 | 1/2008 | Crane et al. | |
| 7,756,145 B2 | 7/2010 | Kettering et al. | |
| 8,019,489 B2 | 9/2011 | Harrison | |
| 8,301,368 B1 * | 10/2012 | Masson | G01C 23/00 |
| | | | 701/400 |
| 8,347,340 B2 | 1/2013 | Lynch et al. | |
| 8,958,945 B2 | 2/2015 | Ovens | |
| 9,003,085 B2 | 4/2015 | Saugnac | |
| 9,043,055 B2 | 5/2015 | Perira | |
| 9,260,182 B2 * | 2/2016 | Hathaway | H04L 67/12 |
| 10,523,309 B2 | 12/2019 | Zulch, III et al. | |
| 2007/0115938 A1 * | 5/2007 | Conzachi | B64F 5/60 |
| | | | 370/352 |
| 2008/0154446 A1 | 6/2008 | Rui et al. | |
| 2012/0265372 A1 | 10/2012 | Hedrick | |
| 2014/0074322 A1 * | 3/2014 | Baumgarten | G06F 13/4282 |
| | | | 701/3 |
| 2014/0222254 A1 * | 8/2014 | Ribich | F16M 13/022 |
| | | | 701/3 |
| 2015/0074424 A1 | 3/2015 | Uczekaj et al. | |

FOREIGN PATENT DOCUMENTS

| | | |
|---|---|---|
| CN | 103246692 A | 8/2013 |
| CN | 103312408 A | 9/2013 |
| CN | 103674468 A | 3/2014 |
| EP | 2706386 A2 | 3/2014 |
| EP | 2869247 A1 | 5/2015 |
| WO | 2006086259 A2 | 8/2006 |
| WO | 2013147991 A1 | 10/2013 |

OTHER PUBLICATIONS

European Examination Report dated Dec. 7, 2018, European Patent Application No. 16207326.6, 6 pages.

European Patent Office; Extended European Search Report for European Patent Application No. 16207326.6 dated Jul. 27, 2017, 8 Pages.

Japanese Office Action dated Oct. 27, 2020 for Japanese Patent Application No. 2017-006359, 6 pages (including English translation).

Canadian Office Action dated Oct. 13, 2020 for Canadian Patent Application No. 2,953,925, 4 pages.

Chinese First Office Action dated Apr. 2, 2021 for Chinese Patent Application No. 2017100952031, 28 pages (including English translation).

* cited by examiner

METHOD AND SYSTEM FOR INTEGRATION OF PORTABLE DEVICES WITH FLIGHT DECK DISPLAYS

CROSS-REFERENCE TO RELATED APPLICATIONS

This application is a continuation of U.S. application Ser. No. 15/054,788 filed Feb. 26, 2016, now U.S. Pat. No. 9,980,298, issued May 22, 2018, the contents of which are incorporated herein by reference in its entirety.

FIELD

This invention related to airplanes and more particularly to the use of flight deck multifunction displays to distribute various kinds of information to the flight crew of an airplane.

BACKGROUND

Modern commercial airplanes include numerous avionics display systems and electronic control systems. The use of such systems is regulated and approved by various governmental authorities around the world. Such systems are classified by these regulatory authorities according to the hazard level presented to an aircraft in flight if a system fails. As an example, a system might be certified as a "Level A" certified system if failure of the system would be very serious or catastrophic. A system might be classified as a "Level D" certified system if failure of the system would present a minor hazard that could be dealt with reasonably by a properly trained and alert crew. Level B certified systems and Level C certified systems fall between these two extremes.

Some systems on an aircraft, such as an electronic flight bag (EFB) may not be certified. These systems are typically those added by or for a specific airline and are not part of the basic, factory-provided flight systems. A governmental authority also gives approval for these systems to be used operationally during flight but there are less stringent design requirements because a failure of one of these systems has no impact on the safety of flight. The result is an easier path to iterate the design and evolve the functionality over time without the requirement of an expensive re-certification effort. Many of these uncertified systems provide supplemental information to the crew, such as dispatch routing, planning and payload information.

Over the past decade, there has been a significant shift in how such information is consumed on the flight deck. Manuals, flight plans, charting information, performance tables, etc. that assist the flight crews in performing their overall mission but are not critical to the operation of the airplane were provided in paper form for many years. However, in the current technological and economic environment, flexible, uncertified, tablet-based computing systems are being used to provide this information to pilots. Such a system is referred to as a portable electronic device (PED) based EFB. This format allows airlines to more easily realize the weight and handling cost savings associated with eliminating paper-based information. In order to be used during all phases of flight, however, these PED-based EFB systems must be securely mounted in the flight deck. Unfortunately, in some flight decks, there is not sufficient space or a suitable location to mount a PED for easy viewing and interaction. In addition, it is sometimes difficult to position a tablet computer for shared viewing or convenient viewing alongside flight deck multifunction displays resulting in more difficult crew coordination reducing the overall usability of the PED-based EFB information.

SUMMARY

In at least some embodiments of the invention, a method of accessing a portable electronic device (PED) includes providing an onboard network coupled to a flight-deck-installed, multi-function display and coupling the PED to the onboard network. In such an embodiment, the method also includes receiving information from a PED hosted application in the PED, routing the information through a gateway, and displaying the information on the flight-deck-installed, multi-function display. In some embodiments, a pilot control interface is coupled to the PED through the onboard network, and a plurality of functions on the PED is controlled via the pilot control interface.

In at least some embodiments of the invention, an airplane includes a fuselage portion and a wing portion. The airplane also includes a flight-deck-installed, multi-function display, an onboard network, a security gateway connected to the onboard network, and an aircraft interface device (AID) connected to the onboard network to couple a portable electronic device (PED) to the onboard network. The aircraft interface device is operable to receive information from a PED hosted application through a gateway and route the information through a gateway or gateways to the airplane's avionics. Avionics then displays the information on the flight-deck-installed, multi-function display. The airplane in some embodiments can also include an aircraft data network used by certified avionics for communication between certified components, a flight deck crew network accessible by operationally approved, un-certified applications hosted on the PED wherein an application gateway on the AID routes information between the aircraft data network and the flight deck crew network through a security gateway. In some embodiments, a plurality of firewalls isolates the aircraft data network and the flight deck crew network. The aircraft data network and flight deck crew network can alternatively be described as an aircraft control domain and aircraft information domain, respectively, where the aircraft information domain has a lower security and certification level than the aircraft control domain.

In at least some embodiments of the invention, a system includes a flight-deck-installed, multi-function display, and an onboard network, which may further include a flight deck crew network and an aircraft data network. The system can also include the security gateway, the aircraft interface device, and avionics systems connected to the onboard network and the flight-deck-installed, multi-function display to display the information on the flight-deck-installed, multi-function display. Instructions stored on a computer readable storage medium can be provided to, or stored within the system, wherein these instructions establish the onboard network coupled to a flight-deck-installed, multi-function display, for example, by providing the appropriate protocol stacks. The instructions can also couple the PED to the onboard network, receive information from a PED hosted application in the PED, route the information through a gateway or gateways, and display the information on the flight-deck-installed, multi-function display, as well as provide for other functions and/or features described herein.

The features, functions, and advantages that have been discussed can be achieved independently in various embodi-

Figure 1:
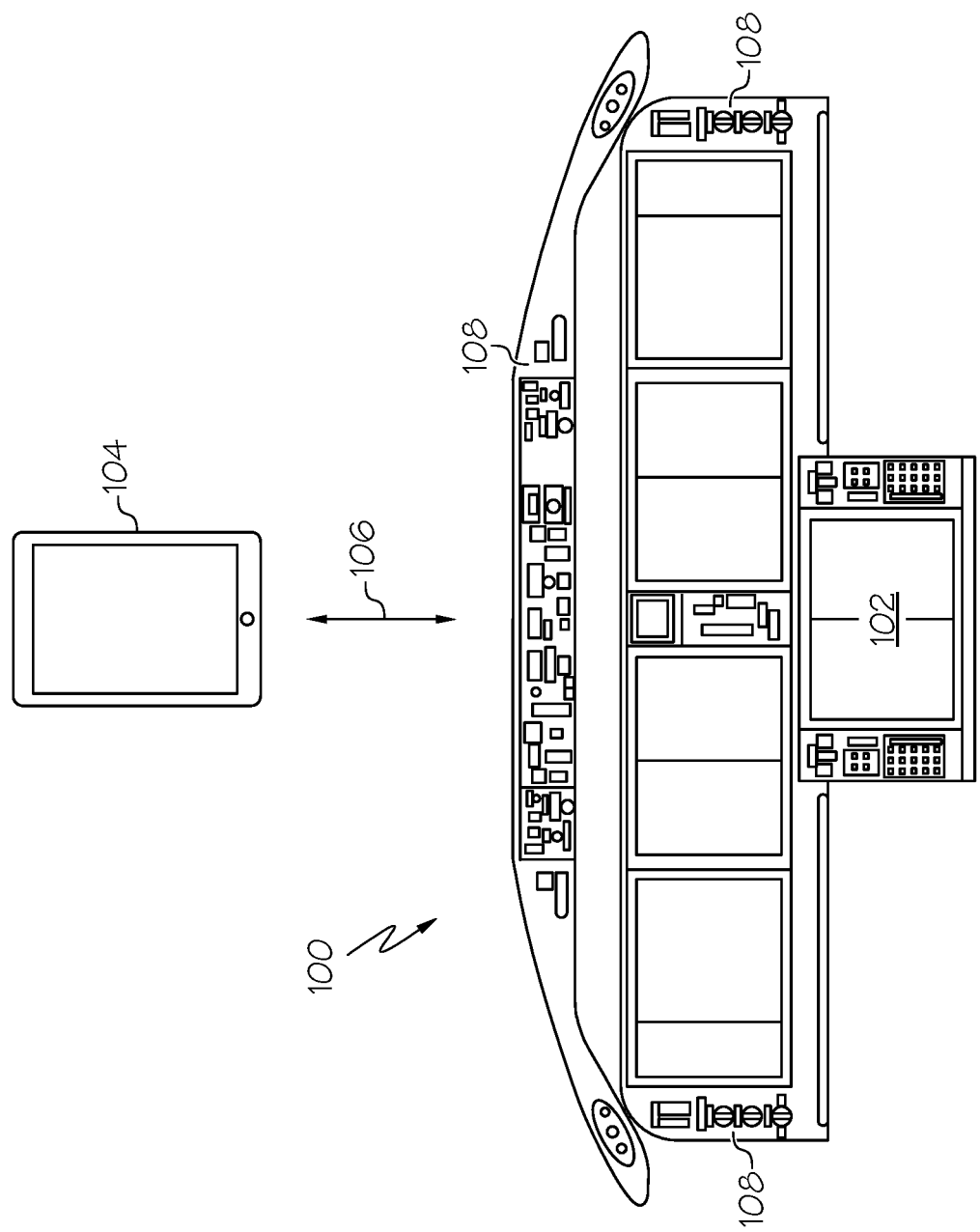
FIG. 1 is an illustration of a portion of the flight deck of an airplane in an exemplary embodiment of the invention.

Each figure shown in this disclosure shows a variation of an aspect of the embodiments presented, and only differences will be discussed in detail.

DETAILED DESCRIPTION

Embodiments of the invention provide for the use of the main flight deck multi-function displays to distribute portable information brought onboard an airplane across multiple flight deck display surfaces. This capability allows the crew of an airplane to take advantage of powerful and flexible tablet devices to host uncertified information that can be integrated with other information typically shown on the main flight deck displays. This capability can improve the ergonomics of using electronic flight bag (EFB) or other applications hosted on a portable electronic device (PED) by allowing utilization of larger display surfaces and by allowing crewmembers to more easily share information in a viewable location. Such capability may allow airlines to remove backup PEDs from the flight deck that were a contingency in case of device failure, resulting in cost savings. Crewmembers can also share joint attention to a common viewable display in order to promote good crew management practices. Information can be distributed across multiple displays in the flight deck to promote better situational awareness, and reduced workload associated with information search. Since larger displays are available for tablet-based information, smaller, less expensive devices such as smart phones can be used to display information, again resulting in cost savings.

With at least some embodiments of the invention, the aircraft's network is used to securely integrate graphical information directly from a tablet application with airplane-hosted information. Images and/or video is/are output to the display avionics for presentation on the main multi-function flight deck displays. In some embodiments, the system makes crew inputs available to the tablet-hosted application to make the tablet-hosted application fully interactive on the main multi-function displays. All interactions are mediated directly between the PED-hosted application and airplane-hosted systems eliminating any dependencies on specific tablet hardware or operating systems. This arrangement makes the system flexible and enables new features to be added easily.

This detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 is a forward perspective view of an exemplary portion of an airplane flight deck panel 100 that includes at least one multi-function display head with screen 102 in accordance with an embodiment of the present invention. In the exemplary embodiment, the display screen is positioned on airplane flight deck panel 100. In this view, a portable electronic device (PED) 104 is also shown. A connection 106 has been established between PED 104 and certified systems aboard the airplane, portions of which lie out of view of panel 100, for example, in an electronics bay. During aircraft operation, screen 102 is available for viewing by a pilot and/or co-pilot of the airplane and can be made to display information hosted on PED 104. It is also possible for any or all of various pilot controls in pilot control interface 108 to be coupled to PED 104 to provide input to PED 104. Detailed examples of specific input and control devices that may be included in the pilot control interface include a touchpad, a trackball, a rotary selection control ("tabber,") a single-touch touchscreen, a multi-touch touchscreen, a pressure sensitive touchscreen, a multi-function keypad, an MCDU scratchpad, a user eye tracking device, a voice activation/voice control device, and a system automation input device. It is also possible for a remote control device or a control from a separate PED to be coupled through the system as described herein.

Figure 2:
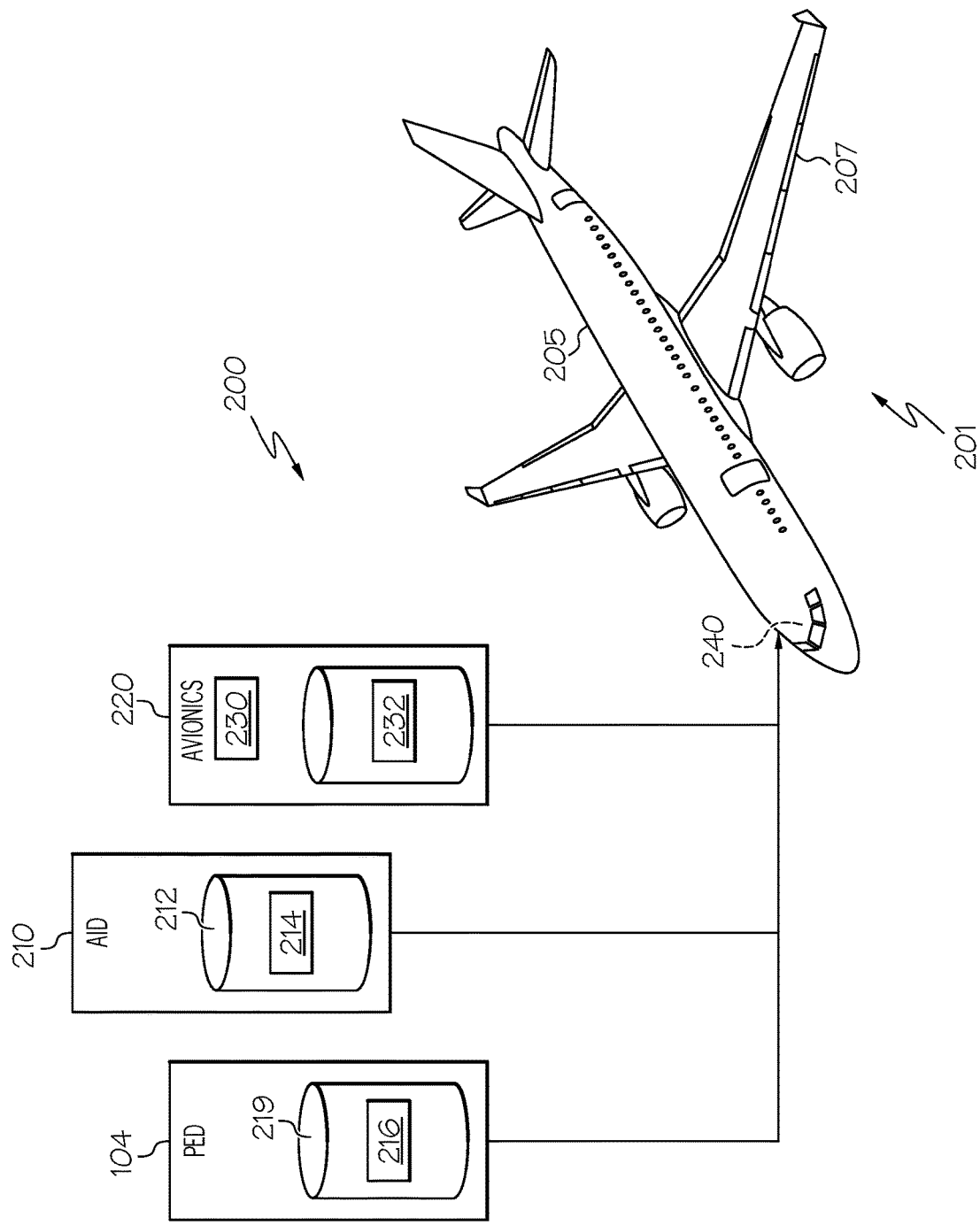
FIG. 2 is an illustration of an airplane in an exemplary embodiment of the invention.

FIG. 2 is a schematic illustration of an airplane 201 having a system 200 configured to display information from a PED in accordance with an embodiment of the invention. Portions of the system 200 can be housed in or near a flight deck 240 of the aircraft 201 for access by a crewmember. Portions may also be located in service bays, racks, and the like in other parts of the airplane, such as fuselage 205, which is connected to wings 207. In one aspect of this embodiment, the system 200 can include a flight-deck-mounted, multi-function display like that shown in FIG. 1, a PED 104, and an aircraft interface device (AID) 210 connected to a flight deck crew network (not shown) to establish a connection with a portable electronic device (PED), wherein the AID establishes the connections to PEDs. The AID is operable to access a computer readable storage medium 212 that provides executable computer program instructions 214 to implement an application gateway to receive image data from the PED over the flight deck crew network. The system in such an embodiment also includes avionics 220 connected to the AID and including the flight-deck-mounted, multi-function display to receive the image data from the AID and display an image or images corresponding to the image data on the flight-deck-mounted, multi-function display. The avionics can, in example embodiments, include a security gateway 230, wherein at least some pilot interaction data and/or image data and/or other information passes through the security gateway on its way to and/or from the PED. Computer readable storage medium 232 includes executable computer program instructions to create the security gateway.

All of the system components that are included within the AID and avionics illustrated in FIG. 2 are certified computing systems that include a processor and other components typical of such systems and thus the system 200 as well as any of the component computing platforms can be referred to herein as a certified system. In the example embodiment of FIG. 2, image frames and/or the pilot interaction data pass from/to PED 104 and this communication to and from the PED is managed by an application gateway that instantiates from computer program instructions 214 on non-transitory storage medium 212 within the AID and from computer program instructions 216 on non-transitory storage medium 219 within the PED. The functions provided by the application gateway can include, as examples, at least some of device authentication, bandwidth monitoring, content analysis, enforcement of regulatory policies, enforcement of and configurability to airline policies, warning/alerting, operational status monitoring, failure handling, intermediate formatting, and compositing of application information. Some of these functions can also or alternatively be provided by the security gateway. The security gateway and the AID work together to provide multiple layers of network security. The term "gateway" as used herein can refer to either or both of the application gateway and the security gateway when describing different aspects of the disclosure.

Figure 3:
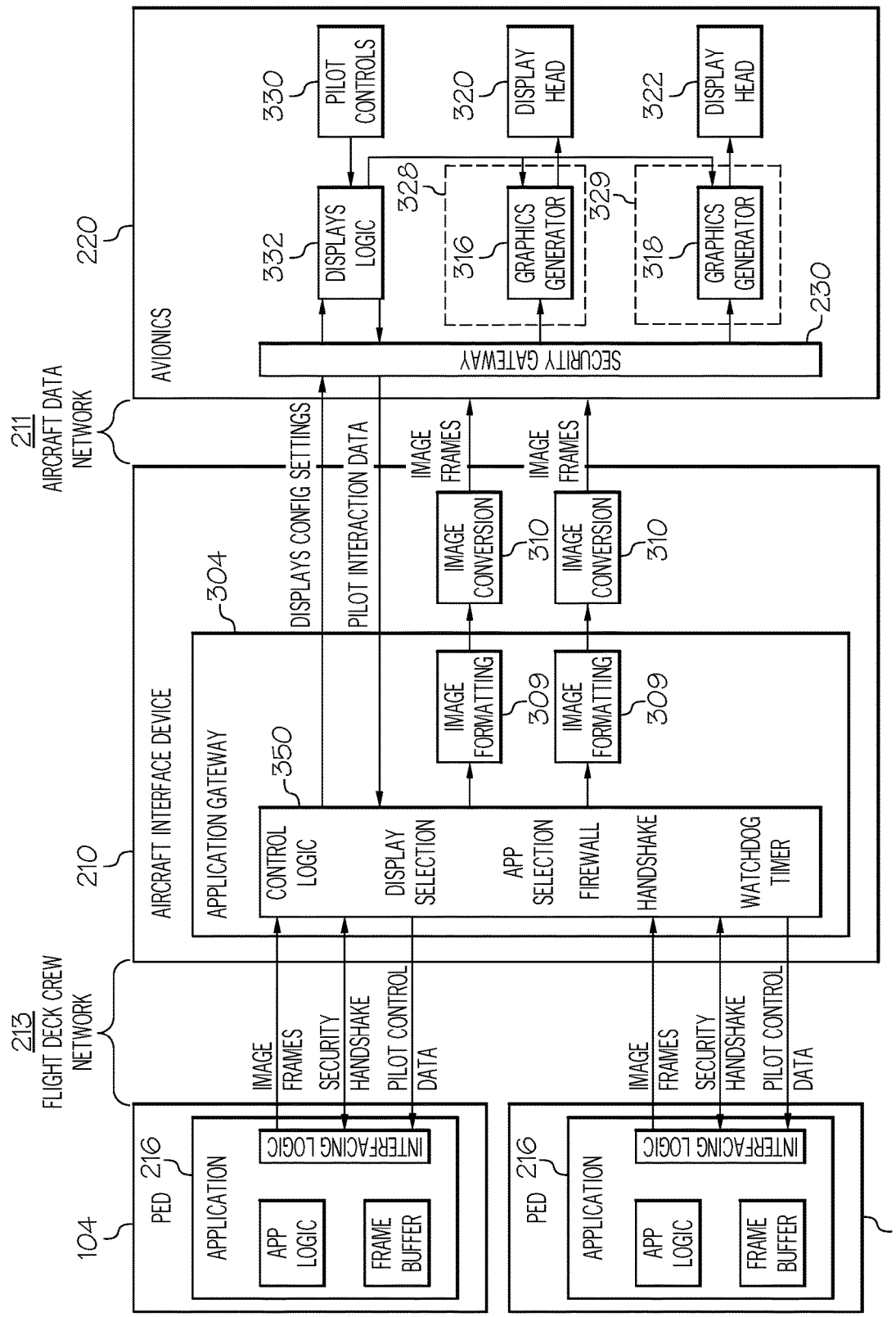
FIG. 3 is an illustration of hardware and/or software entities in an exemplary embodiment of the invention.

FIG. 3 is a more detailed schematic system block diagram of system 200 from FIG. 2, but with two PEDs 104 connected. In this example, each PED 104 includes an application 216. As previously mentioned, the on-board computing systems and applications are all certified. The PED and its resident applications are uncertified but may be operationally approved. A PED application includes application logic and an off-screen frame buffer. The application also includes interfacing logic and an accompanying command library for interfacing with the application gateway 304 in AID 210. The application gateway interface 350 includes control logic, a display selection function, an application selection function, and management functions such as device and application authentication, bandwidth monitoring, handshaking, a watchdog timer, failure handling and the like. The application gateway also includes intermediate image formatting and image conversion for standard digital video interface (DVI) outputs. The application gateway in addition includes one of many possible firewalls that can be included in the system to isolate the aircraft data network 211 and the flight deck crew network 213.

PEDs 104 of FIG. 3 are connected to the AID through a flight deck crew network, which provides for the transfer of information including image data, filtered pilot control or interaction data, and application handshakes, which in part are used to establish a secure connection between the PED and on-board systems. The interface in this example may be either a wireless interface such as Wi-Fi or a standard wired Ethernet interface or connection. The interface can be implemented using any secure wired or wireless connection, including a wireless interface such as Bluetooth or NFC, or an avionics full duplex switched Ethernet (AFDX) connection.

Still referring to FIG. 3, AID 210 includes image formatting function 309 within the application gateway 304, and image conversion 310, which receives image data from the formatting function. The purpose of the AID is to protect certified systems from uncertified, typically operationally approved systems. Image data can include data to provide video or still images, or a combination of the two, including compressed video information. In the example embodiment shown, the conversion is handled by converters implemented by field programmable gate array (FPGA) chips within the AID hardware. These converters take standard image frame data (DVI format as an example) as input and converts the image frames to image frames that can be passed over another standard video interface, as an example, an A818 avionics digital video bus (ADVB), which is part of the aircraft data network.

Two sets of image frame data are supplied to avionics 220 as shown in FIG. 3. One set of image frame data is supplied to graphics generator module 316 and another set of image frame data is supplied to graphics generator module 318, either of which is capable of merging images and/or information from the PED with certified information from the on-board systems for unified presentation on the flight deck, multi-function display heads 320 and 322. Additional firewalls protect the graphics generators. These firewalls are schematically indicated by dotted lines 328 and 329. These displays are pictured in FIG. 3 as part of the avionics 220 since they are part of the certified equipment on the aircraft, however they are often connected via cables to the other avionics hardware, which may reside in an equipment bay. Any of these arrangements can be invoked by reference to the displays or display heads being connected to or part of the avionics.

In addition to illustrating the flow of image frame data, FIG. 3 schematically illustrates the sending of pilot interaction data from flight deck systems to PEDs 104 over the established flight deck crew network. In the example embodiment of FIG. 3, this control data passes from pilot controls 330 to displays logic 332, which manages both the firewalled graphics generators in accordance with display configuration settings received through the aircraft data network. In example embodiments, image data and pilot interaction data pass through the security gateway 230. Displays configuration data can be passed from the application gateway to the displays logic and may include the status of certified display widgets, window management logic, and data layering logic. In some example embodiments, the graphical user interface can be defined with stored binary files according to the ARINC 661 (A661) standard. Pilot interaction data that is ultimately sent to PEDs 104 can include cursor control data. Pilot interaction data can also include touch interaction data, data on the position of rotary tabber interfaces, and data on any other controls that the pilots can manipulate. The AID is operable to send the pilot interaction data from the flight deck to the PED. Pilot interaction data in some embodiments is filtered by the AID application gateway and/or the security gateway before being sent to the PEDs.

As noted above, the system illustrated in FIG. 3 includes a plurality of firewalls to isolate the aircraft data network and the flight deck crew network. The aircraft data network and flight deck crew network can alternatively be described as an aircraft control domain and aircraft information domain, respectively, where the aircraft information domain has a lower security and certification level than the aircraft control domain. A firewall monitors and controls a resource's incoming and outgoing traffic based on predetermined security rules, and thus forms a barrier between a protected network element and other parts of the system. In a system like that shown in FIG. 3, firewalls or subsets of firewall functionality would be present on all connections between components of differing certification levels, protecting the device of higher certification. Firewalls or subsets of firewall functionality would also be present on all connections, which are "open" to or reachable from outside devices or systems that have outside device connectivity (including off-board data links).

Firewalls or subsets of firewall functionality would be present on all components, which process data originating from an open connection or lower-certification component, which has reached the current system by means of a non-inspecting pass-through by a system, which would otherwise not be firewalled. For example, PED applications may be operationally approved and generate data which is received by certified systems on the airplane. The certified systems that initially receive the data do not use the data payload, but instead forwards data to another certified system. Knowing that the first certified system did not inspect the data payload, the second certified system applies a subset of firewall filtering to the data as it is unpacked but before it is used, even though the data was provided by another certified system.

Figure 4:
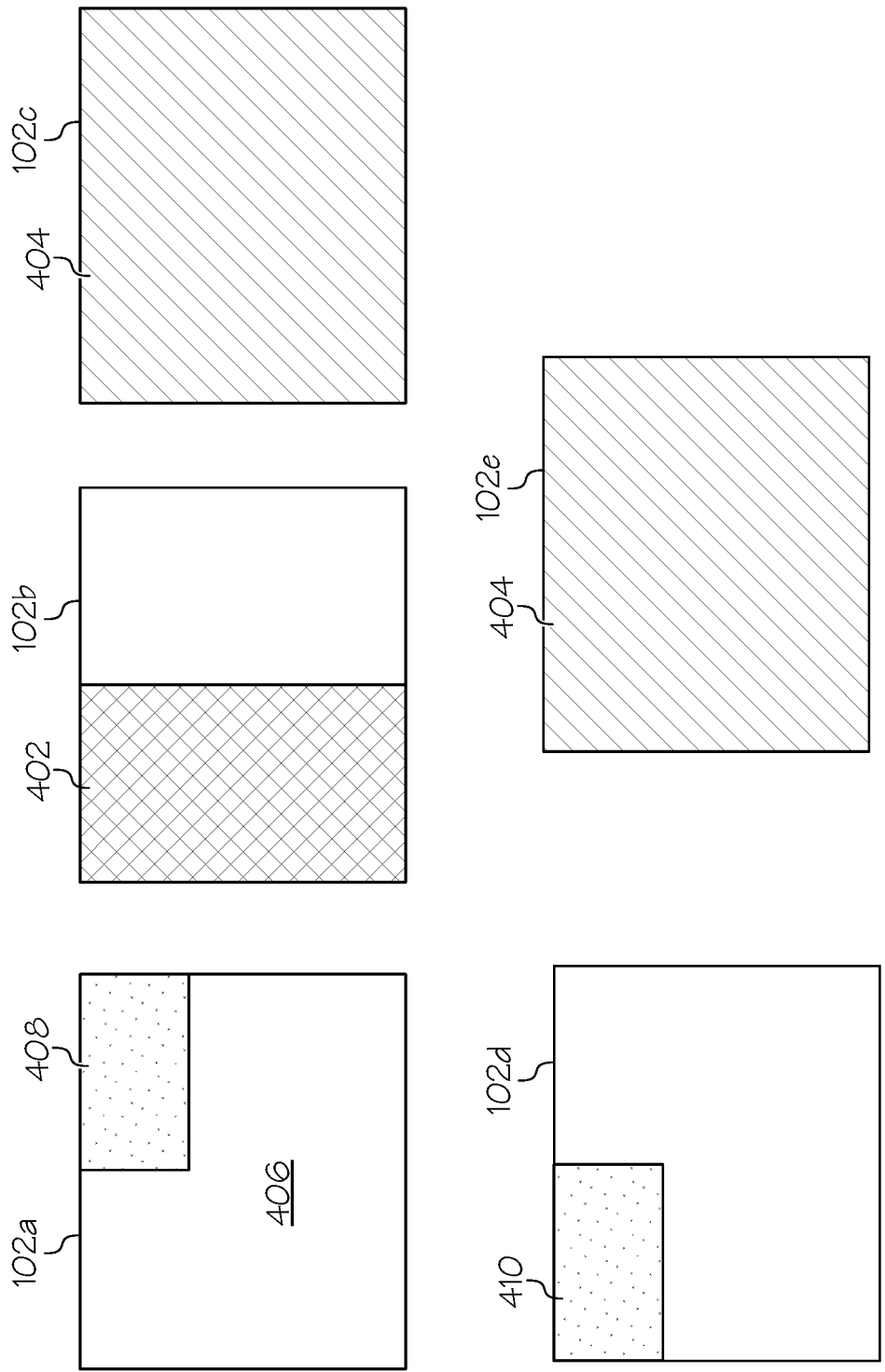
FIG. 4 is a schematic illustration of flight deck display screens in a system in which an embodiment of the invention is in use.

FIG. 4 shows close-up, schematic views of screens 102 from FIG. 1, each shown in detail as screen 102*a*, screen 102*b*, screen 102*c*, screen 102*d*, and screen 102*e*. The arrangement of screens deviates from that shown in FIG. 1 in order to show all screens on a single drawing sheet. Each screen is a visible portion of a flight-deck installed, multi-function display. For purposes of the discussion herein, the term "screen" and the term "display" can be used interchangeably. With example embodiments of the invention, a plurality of input and control devices and the flight-deck-installed, multi-function display screens are usable by a plurality of users. Each user can provide input and control his or her own PED and flight-deck-installed, multi-function display. Each user can provide input and exclusively control an application on another user's PED from their own input and control device and flight-deck-installed, multi-function display. Alternatively, each user can control separate PEDs independently or users can cooperatively control a single PED.

In FIG. 4, applications hosted with the displays can include a window on the flight-deck-installed, multi-function display, such as window 402 on display 102*b*, indicated by cross-hatched lines. Applications can also include a window managed across multiple flight-deck-installed, multi-function displays such as application 404, indicated by diagonal lines, managed across displays 102*c* and 102*e*. Multiple applications on multiple devices can also be hosted with a diversity of pilot control interfaces, including an ability to operate without the pilot control interfaces. Compositing of certified information 406 and operationally approved information 408 (shown with stippling) is also shown on display 102*a*. Multiple user and shared/exclusive application environment applications are also supported. Device-based status information including additional application categories can be sent to a gateway. Operationally approved information 410 on display 102*d* shares some of the same information as shown in operationally approved information 408.

Still referring to FIG. 4, information sent to the avionics can be from applications with additional application categories. These applications can include a hosted application with an abstract nature, a non-video application, a function one or more of video displays 102*a*, 102*b*, 102*c*, 102*d*, and/or 102*e*. The PED can utilize the flight-deck-installed, multi-function display as a passive display terminal without any requirement for display or graphics generation/output hardware, or any native forms of input or interactivity within the PED. The function of the video display can provide a service to directly connect an abstract application for display on and interaction with a flight-deck-installed, multi-function display, regardless of specifics, services, capabilities or operating system of the PED.

An "abstract application" is an application that does not fit the traditional concept of what a user expects an "application" to be. Examples of a traditional application include one that is launched on demand, generates graphics or present imagery in a rectangular view on a display surface, and is controllable or interactive in some way such as by direct touch interaction, manipulation by a mouse/touchpad driven cursor, etc. Abstract applications are often not called up on-demand, serving as more of a "function" than an "application." As examples, an application which runs in the background, waits for data from an external input, and sends that data to a display as a notification could be considered an abstract application. Applications that are not interactive can be considered abstract applications. Applications that run without displaying content, whether or not they are interactive, may be considered abstract applications. Applications, which create displays of irregular shapes or sizes, such as one that creates arc-shaped weather radar imagery may be abstract applications. Applications which are launched on demand without the end user being aware of their existence, serving as more of a "service" than an "application" can be considered abstract applications.

As further examples of abstract applications, an application, which renders a layer or contributing piece of imagery, which is ingested, processed, and presented to the user as part of a different application or function would be an abstract application. As a more specific example, an application which retrieves and renders weather imagery, which is handed off and then used by a pilot-facing navigation display that doesn't have native weather retrieval capabilities is an abstract application. Applications that present a display and are interactive, but whose sole purpose is to influence a different system or application are abstract applications. As an example, a "remote control" type of application, such as an emulated version of a flight deck physical button control panel can be considered an abstract application. Applications, which run in the background to facilitate connectivity with the aircraft or the forward display system are abstract applications.

Figure 5:
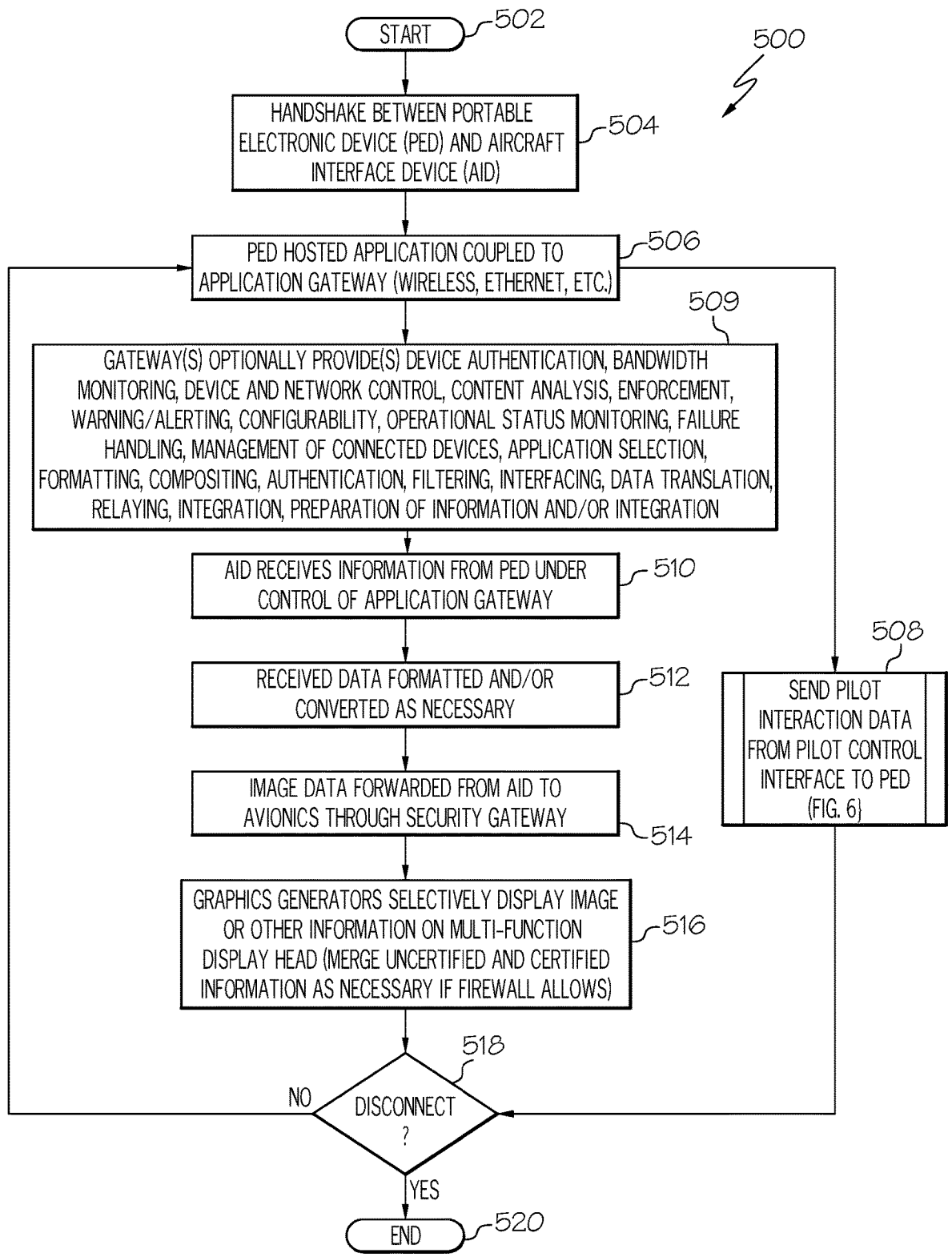
FIG. 5 is an illustration of operations performed by one embodiment.

FIG. 5 is an illustration of operations performed by one embodiment. The sequence of operations for the process is illustrated in flowchart form. Process 500 begins at start block 502. At block 504, a handshake takes place between the PED(s) and the AID. At block 506, a PED hosted application is coupled to the on-board network, more specifically in this example to the application gateway in the AID. A connection is now established between the PED(s) and the certified systems on the airplane. Information from the PED(s) and pilot interaction data are sent at the same time. At block 508, pilot interaction data is selectively sent to the PED(s) from the pilot control interface. Sending pilot interaction data is further described below with respect to FIG. 6. By "selectively sent," what is meant is that the crewmembers and/or the avionics and/or the application gateway can control which data is sent—not every pilot interaction is necessarily sent to a given PED. For example, there may be multiple PEDs connected and any PED may have multiple applications running. Selectivity can include sending interaction data only to a specific PED or PEDs or only to a specific application in a specific PED or PEDs rather than to all applications running in a PED or all PEDs.

At block 509 of FIG. 5, the application gateway provides any or all of many services. These services can also be provided by the security gateway, or the services can be distributed across both gateways. At block 510, the certified AID receives information from the PED(s) under the control of the AID application gateway. This information may include image frames for images to be displayed on the flight deck. The services provided by the gateway can include device authentication, bandwidth monitoring, device and network control, content analysis, enforcement of regulatory policies, enforcement of and configurability to airline policies, warning/alerting, operational status monitoring, and/or failure handling. Additional services provided by the application gateway can include management of connected devices, application selection, intermediate formatting, compositing of application information, application authentication, filtering of devices and/or applications, which can or cannot communicate with the system, and/or interfacing and data translation between disparate system components. The application gateway can also relay aircraft information data and pilot interaction control data, enforce compliance with flight deck human interface standards and guidelines, enforce airplane manufacturer policies and acceptability as per an established application governance process and/or integrate applications hosted on operationally approved PEDs with certified or operationally approved applications hosted within the onboard network. The application gateway can also provide preparation of information from the PED for integration and/or layering within functional layered applications on a certified display application.

Still referring to FIG. 5, at block 512, image data or other information is converted as necessary. At block 514, the information is forwarded from the AID to the avionics. This information traverses the security gateway which may be capable of performing all or some of the functions attributed to the application gateway.

Staying with FIG. 5, at block 516, as already described, firewalled graphics modules in the avionics can selectively display an image or images corresponding to the information received from the PED(s) on a multi-function display installed in/on the flight deck of the airplane, through the coupling between the PED and the avionics. The phrase "selectively display" means pilots and avionics functions can control what information is displayed and how the information is displayed. For instance, pilots may choose to display image data from an application in full screen or half screen format, or pilots can choose to replace the PED image with an image in another certified display format. In a failure condition or emergency, the displays logic may exclude the display of operationally approved information on the multi-function displays reserving available space for the more important certified display formats.

Optionally, information from certified and uncertified systems is selectively merged together as needed for display. By "selectively merged" what is meant is that the crewmembers or the avionics can determine how or if the different types of information are merged together. A display can contain information from both certified and non-certified sources. How this information is merged and/or how each is indicated can be pre-programmed within the certified avionics or managed by the application gateway through the forwarding of displays configuration settings to the displays logic. Control over what information to display could be automated or manually selected independently be each pilot. Information can be overlaid, or layered to keep certain information visible or give priority to certain information. If at some point during the process of FIG. 5 a PED is disconnected at block 518 of FIG. 5, the process ends at block 520, at least relative to that PED. Otherwise, process 500 repeats as long as the PED is connected to the flight deck systems.

To elaborate on some of the services that can be provided by the application gateway, device authentication in at least some embodiments includes validating that a device is authorized to communicate with the system. Application authentication, includes validating that an application is authorized to communicate with the system. Bandwidth monitoring includes monitoring communications to ensure that devices are using the available bandwidth to the fullest benefit, but not to the extent of crowding out other network services. Device and network control provides the ability to manage a PED's interactivity with the network, including removing the device from the network. Content analysis can include rule-based inspection of imagery and data being passed through the application gateway. As an example, the enforcement of regulatory policies might include verifying that applications have been operationally approved and accepted for inclusion as part of a governance process by the airplane manufacturer or operating entity, and that applications that have not been approved are not allowed access. An example of enforcement of and configurability to airline policies, might include preventing personally owned PEDs from being connected to the system.

For warning/alerting, the application gateway can provide a mechanism for applications to draw attention to themselves in situations requiring pilot action. For operational status monitoring, the "health" of an application can be monitored to determine its readiness state and performance. The application gateway can provide failure handling by taking action appropriately in the event that one or more system components malfunctions or does not perform as expected. The application gateway can manage connected devices by correlating, listing, displaying, filtering, and assigning of the connected devices. Portions of these services are system tasks, and portions of these services are based on pilot actions. Application selection can be provided by presenting applications in a user interface for selection and activation by the pilot or other user of the system.

The application gateway can provide intermediate formatting by appropriately managing application imagery, which is not an exact match for the display on which it is presented. This intermediate formatting can include "physical" transformations such as scaling, cropping, rotation, positioning, etc., as well as image data manipulations such as those related to color saturation, contrast, sharpening, etc. The compositing of application information includes combining information (imagery and/or data) from one or more PEDs with information or graphical display elements from one or more other sources. To filter devices and/or applications, which can or cannot communicate with the system, applications must know the appropriate communication protocols to interface with the system. Those that do not "speak the right language," or which have incompatible or discontinued/outdated versions of the protocols will be refused the connection or have their connections terminated. The application gateway can provide interfacing and data translation between disparate system components by serving as the central hub of data management for a multitude of separate systems. This service can include retrieving data, processing data, and/or forwarding data in formats, which are appropriate for the device, system, or application that is consuming the data. The application gateway can relay aircraft information data and pilot control interaction data by acting as a forwarding bridge to send aircraft data parameters (such as flight management information) and pilot interaction control data (such as touchscreen touch events) from the aircraft systems to a PED through the AID.

The application gateway can also provide for enforcement of and compliance with flight deck human interface standards and guidelines. As an example, these policies may specify the approved color palette for use in flight deck displays. The enforcement of airplane manufacturer or regulatory policies and acceptability as per an established application governance process might include, as an example, prohibiting entertainment applications on the forward displays. The integration of applications hosted on operationally approved PEDs with certified or operationally approved applications hosted by the AID may include compositing and screen sharing of parallel functions from different sources and certification levels. The preparation of information from a PED for integration and/or layering within functional layered applications on a certified display application may include processing, formatting, geo-referencing, compositing, and/or selective display of information layers (data or imagery), which will contribute to a composite representation of multi-sourced data/imagery on a forward display.

Figure 6:
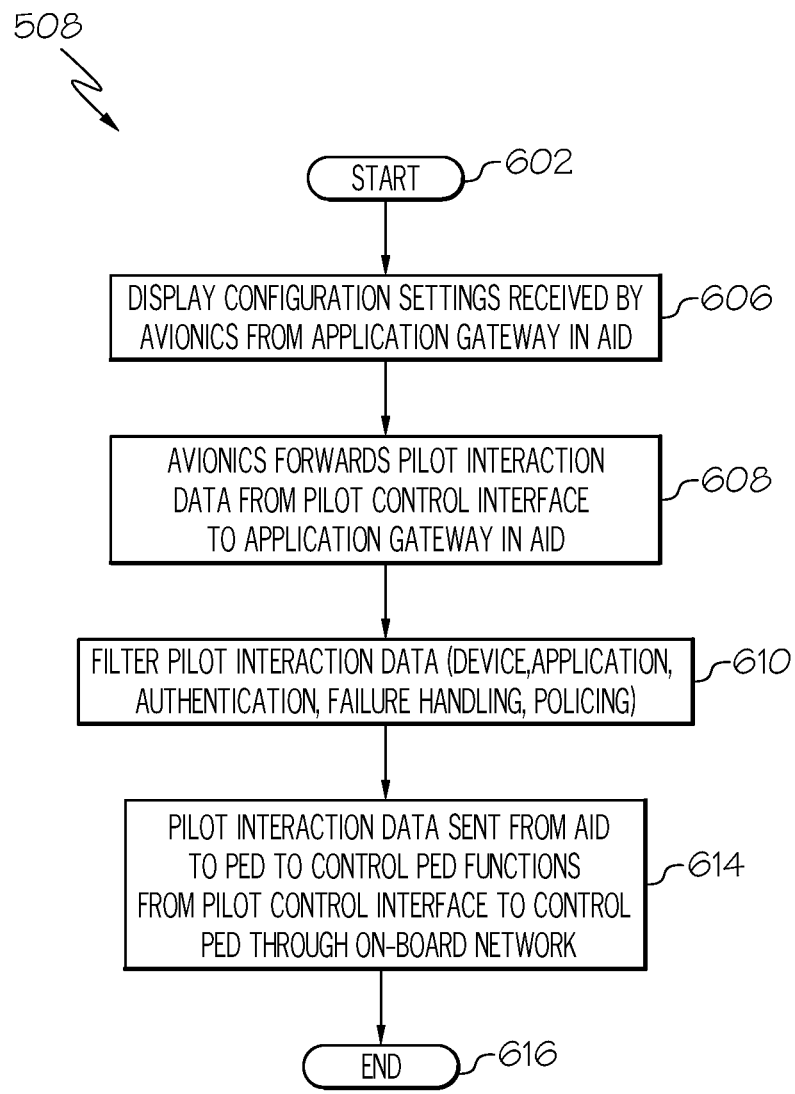
FIG. 6 is an illustration of operations performed by another embodiment.

FIG. 6 is an illustration of operations performed by one embodiment. The sequence of operations for the process corresponds to block 508 of FIG. 5 and it is again illustrated in flowchart form. It should be noted that the process of allowing crew control of a PED includes information moving two ways. Display configuration settings and similar information related to specifying the display interface is sent to from the application manager to the avionics in order to define the configurations of flight deck controls, while the pilot interaction data related to accessing the PED is sent from the pilot control interface to the PED over the established connection through the relevant networks, the aircraft data network and the flight deck crew network. Display configuration settings information are formatted as requests. These requests can be acted on by the avionics or not in accordance with policies that are programmed into the avionics, for example, as part of the security gateway or displays logic functions as described above. Process 508 starts at block 602. At block 606, graphical display configuration data is received by the avionics through the security gateway from the AID application gateway. At block 608, the avionics forwards pilot interaction data to the application gateway in the AID. At block 610, pilot interaction data are filtered prior to being sent to the PED. Filtering can include, as examples, device filtering and application filtering, and policing relative to various regulatory or airline policies as described above. Device and application filtering ensure that the correct pilot input data get to the right device and application. At block 614, pilot interaction data is sent from the AID to the PED through the onboard network to control PED functions from the pilot control interface in the flight deck of the airplane. Process 508 ends at block 616, although in the context of the larger process shown in FIG. 5, process 508 repeats just as portions of the process of FIG. 5 repeat.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may in fact, be executed substantially concurrently, or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purposes of describing particular embodiments only and it is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

The invention claimed is:

1. A method of accessing a portable electronic device (PED) on board an aircraft, the method comprising:
   providing an onboard network coupled to a flight-deck-installed, multi-function display, wherein the onboard network comprises a flight deck crew network and an aircraft data network;
   coupling the PED to the onboard network;
   receiving information from a PED hosted application in the PED by an aircraft interface device;
   routing the information through the aircraft interface device to the aircraft data network;
   receiving the information from the aircraft data network by a security gateway, wherein the aircraft interface device and the security gateway provide multiple layers of network security;
   displaying the information on the flight-deck-installed, multi-function display; and
   coupling a pilot control interface to the PED through the onboard network, wherein the coupling of the pilot control interface to the PED comprises coupling a plurality of input and control devices to the PED, the plurality of input and control devices and the flight-deck-installed, multi-function display are usable by a plurality of users where each user can provide input and control their own PED and flight-deck-installed, multi-function display.

2. The method of claim 1 further comprising controlling a plurality of functions on the PED via the pilot control interface.

3. The method of claim 2 wherein the plurality of input and control devices includes: a touchpad, a trackball, a rotary selection control or tabber, ("tabber,") a single-touch touchscreen, a multi-touch touchscreen, a pressure sensitive touchscreen, a multi-function keypad, an MCDU scratchpad, a user eye tracking device, a voice activation/voice control device, a system automation input device, a remote control device, a control from a separate PED, or a combination thereof.

4. The method of claim 3 where each user can provide input and exclusively control an application on another user's PED on their flight-deck-installed, multi-function display, where each user can control separate PEDs independently, and where users can cooperatively control a single PED.

5. The method of claim 1 wherein the aircraft interface device comprises an application gateway wherein the application gateway or the security gateway is operable to provide a function comprising: device authentication, bandwidth monitoring, device and network control, content analysis, enforcement of regulatory policies, enforcement of and configurability to airline policies, warning/alerting, operational status monitoring, failure handling, management of connected devices, application selection, intermediate formatting, compositing of application information, application authentication, filtering of devices and applications which can or cannot communicate with the onboard network, interfacing and data translation between disparate system components, relaying of aircraft information data and pilot interaction control data, enforcement of and compliance with flight deck human interface standards and guidelines, enforcement of airplane manufacturer policies and acceptability as per an established application governance process, integration of applications hosted on operationally approved PEDs with certified or operationally approved applications hosted within the onboard network, preparation of information from the PED for integration or layering within functional layered applications on a certified display application, or a combination thereof.

6. The method of claim 1, wherein for a function of video display, the PED utilizes the flight-deck-installed, multi-function display as a passive display terminal without any requirement for display or graphics generation/output hardware on the PED, or any native forms of input or interactivity on the PED and wherein the function of video display provides a service to directly connect an abstract application to the multi-function displays via the gateway for display and interaction on the flight-deck regardless of specifics, services, capabilities or operating system of the PED.

7. The method of claim 1, wherein applications hosted with flight-deck-installed, multi-function display comprise: a window on the flight-deck-installed, multi-function display, a window managed across multiple flight-deck-installed, multi-function displays, multiple application on multiple devices, a diversity of pilot control interfaces including an ability to operate without the pilot control interfaces, an abstract nature of hosted applications including a non-video application, a compositing of certified and operationally approved information, a multiple user and shared/exclusive application environment application, device-based status information sent to a gateway including additional application categories, or a combination thereof.

8. An airplane comprising:
   a fuselage portion;
   a wing portion; and
   a flight-deck-installed, multi-function display;
   an onboard network comprising an aircraft data network and a flight deck crew network, wherein the onboard network comprises a plurality of firewalls to isolate the aircraft data network and the flight deck crew network;
   a gateway connected to the onboard network, wherein the gateway comprises a security gateway;
   an aircraft interface device connected to the onboard network to couple a portable electronic device (PED) to the flight-deck-installed, multi-function display, the aircraft interface device operable to receive information from a PED hosted application in the PED and route the information through the gateway, wherein the aircraft interface device and the security gateway provide multiple layers of network security and wherein the aircraft data network is used by certified avionics for communication between certified components and the flight deck crew network is accessible by operationally approved, un-certified applications hosted on the PED wherein the gateway routes information between the aircraft data network and the flight deck crew network; and
   avionics to display the information on the flight-deck-installed, multi-function display.

9. The airplane of claim 8 wherein the flight deck crew network comprises a wired Ethernet interface.

10. The airplane of claim 8 wherein the flight deck crew network comprises a wireless interface.

11. The airplane of claim 8 further comprising a pilot control interface wherein the aircraft interface device is further operable to couple the pilot control interface to the PED through the onboard network to enable controlling a plurality of functions on the PED via the pilot control interface.

12. The airplane of claim 11 wherein the pilot control interface comprises a plurality of input and control devices including: a touchpad, a trackball, a rotary selection control or tabber, a single-touch touchscreen, a multi-touch touchscreen, a pressure sensitive touchscreen, a multi-function keypad, an MCDU scratchpad, a user eye tracking device, a voice activation/voice control device, a system automation input device, a remote control device, a control from a separate PED, or a combination thereof.

13. The airplane of claim 12 wherein the plurality of input and control devices and the flight-deck-installed, multi-function display are usable by a plurality of users where each user can provide input and control their own PED and flight-deck-installed, multi-function display,
   where each user can provide input and exclusively control an application on another user's PED on their flight-deck-installed, multi-function display, where each user can control separate PEDs independently, and where users can cooperatively control a single PED.

14. The airplane of claim 8 wherein the gateway is operable to provide a function comprising: device authentication, bandwidth monitoring, device and network control, content analysis, enforcement of regulatory policies, enforcement of and configurability to airline policies, warning/alerting, operational status monitoring, failure handling, management of connected devices, application selection, intermediate formatting, compositing of application information, application authentication, filtering of devices and applications which can or cannot communicate with the onboard network, interfacing and data translation between disparate system components, relaying of aircraft information data and pilot interaction control data, enforcement of and compliance with flight deck human interface standards and guidelines, enforcement of airplane manufacturer policies and acceptability as per an established application governance process, integration of applications hosted on operationally approved PEDs with certified or operationally approved applications hosted within the onboard network, preparation of information from the PED for integration or layering within functional layered applications on a certified display application, or a combination thereof.

15. The airplane of claim 8, wherein for a function of video display, the PED utilizes the flight-deck-installed, multi-function display as a passive display terminal without any requirement for display or graphics generation/output hardware on the PED, or any native forms of input or interactivity on the PED and wherein the function of video display provides a service to directly connect an abstract application to the multi-function displays for display and interaction on the flight-deck, regardless of specifics, services, capabilities or operating system of the PED.

16. The airplane of claim 8, wherein applications displayed on flight-deck-installed, multi-function display comprise: a window on the flight-deck-installed, multi-function display, a window managed across multiple flight-deck-installed, multi-function displays, multiple application on multiple devices, a diversity of pilot control interfaces including an ability to operate without the pilot control interfaces, an abstract nature of hosted applications including a non-video application, a compositing of certified and operationally approved information, a multiple user and shared/exclusive application environment application, device-based status information sent to the gateway including additional application categories, or a combination thereof.

17. The airplane of claim 8, wherein the gateway comprises an application gateway and the security gateway, and the aircraft interface device comprises the application gateway and connects the flight deck crew network to the aircraft data network, wherein the application gateway is configured to receive the information from the PED and the security gateway is configured to receive information from the aircraft data network.

18. The airplane of claim 8, further comprising a graphics generator module configured to merge information from the PED with certified information from an onboard system for unified presentation on the flight-deck-installed, multifunction display.

19. The airplane of claim 18, further comprising a firewall to protect the graphics generator module.

20. A system comprising:
a flight-deck-installed, multi-function display;
a flight deck crew network;
an aircraft interface device connected to the flight deck crew network to couple a portable electronic device (PED) to the flight-deck-installed, multi-function display, the aircraft interface device operable to receive information from a PED hosted application in the PED;
an aircraft data network connected to the aircraft interface device;
avionics connected to the aircraft data network and the flight-deck-installed, multi-function display to display the information on the flight-deck-installed, multi-function display, wherein the avionics comprise a security gateway configured to receive the information from the PED from the aircraft data network, wherein the aircraft interface device and the security gateway provide multiple layers of network security; and
a pilot control interface wherein the pilot control interface and the flight-deck-installed, multi-function display are usable by a plurality of users where each user can provide input and control their own PED and flight-deck-installed, multi-function display.

21. The system of claim 20 wherein the aircraft interface device is further operable to couple the pilot control interface to the PED through the flight deck crew network and/or the aircraft data network to enable controlling a plurality of functions on the PED via the pilot control interface.

22. The system of claim 20 where each user can provide input and exclusively control an application on another user's PED on their flight-deck-installed, multi-function display, where each user can control separate PEDs independently, and where users can cooperatively control a single PED.

23. The system of claim 20 wherein the aircraft interface device comprises an application gateway wherein the application gateway or the security gateway is operable to provide a function comprising: device authentication, bandwidth monitoring, device and network control, content analysis, enforcement of regulatory policies, enforcement of and configurability to airline policies, warning/alerting, operational status monitoring, failure handling, management of connected devices, application selection, intermediate formatting, compositing of application information, application authentication, filtering of devices and applications which can or cannot communicate with the system, interfacing and data translation between disparate system components, relaying of aircraft information data and pilot interaction control data, enforcement of and compliance with flight deck human interface standards and guidelines, enforcement of airplane manufacturer policies and acceptability as per an established application governance process, integration of applications hosted on operationally approved PEDs with certified or operationally approved applications hosted within the flight deck crew network, preparation of information from the PED for integration or layering within functional layered applications on a certified display application, or a combination thereof.

24. The system of claim 20, wherein for a function of video display, the PED utilizes the flight-deck-installed, multi-function display as a passive display terminal without any requirement for display or graphics generation/output hardware on the PED, or any native forms of input or interactivity on the PED and wherein the function of video display provides a service to directly connect an abstract application to the multi-function displays for display and interaction on the flight-deck, regardless of specifics, services, capabilities or operating system of the PED.

25. A non-transitory computer readable storage medium for accessing a portable electronic device (PED) comprising instructions stored thereon, that when executed on a processor, perform a method further comprising:
establishing an onboard network coupled to a flight-deck-installed, multi-function display, wherein the onboard network comprises a flight deck crew network and an aircraft data network;
coupling the PED to the onboard network;
receiving information from a PED hosted application in the PED by an aircraft interface device;
routing the information through the aircraft interface device to the aircraft data network;
receiving the information from the aircraft data network by a security gateway, wherein the aircraft interface device and the security gateway provide multiple layers of network security;
displaying the information on the flight-deck-installed, multi-function display; and
coupling a pilot control interface to the PED through the onboard network, wherein the coupling of the pilot control interface to the PED comprises coupling a plurality of input and control devices to the PED, the plurality of input and control devices and the flight-deck-installed, multi-function display are usable by a plurality of users.

26. The computer readable storage medium of claim 25 wherein the method further comprises controlling a plurality of functions on the PED via the pilot control interface.

27. The computer readable storage medium of claim 26 wherein the routing of the information through the aircraft interface device further comprises providing a function comprising: device authentication, bandwidth monitoring, device and network control, content analysis, enforcement of regulatory policies, enforcement of and configurability to airline policies, warning/alerting, operational status monitoring, failure handling, management of connected devices, application selection, intermediate formatting, compositing of application information, application authentication, filtering of devices and applications which can or cannot communicate with the onboard network, interfacing and data translation between disparate system components, relaying of aircraft information data and pilot interaction control data, enforcement of and compliance with flight deck human interface standards and guidelines, enforcement of airplane manufacturer policies and acceptability as per an established application governance process, integration of applications hosted on operationally approved PEDs with certified or operationally approved applications hosted within the onboard network, preparation of information from the PED for integration or layering within functional layered applications on a certified display application, or a combination thereof.

28. An airplane comprising:
   a fuselage portion;
   a wing portion; and
   a flight-deck-installed, multi-function display;
   an onboard network;
   an aircraft interface device connected to the onboard network to couple a portable electronic device (PED) to the flight-deck-installed, multi-function display, the aircraft interface device comprises an application gateway operable to receive information from a PED hosted application in the PED and route the information through the application gateway;
   a pilot control interface wherein the aircraft interface device is further operable to couple the pilot control interface to the PED through the onboard network to enable controlling a plurality of functions on the PED via the pilot control interface; and
   avionics to display the information on the flight-deck-installed, multi-function display, wherein the avionics comprise a security gateway configured to receive the information from the PED, wherein the aircraft interface device and the security gateway provide multiple layers of network security.

* * * * *